US012439901B1

(12) United States Patent
Duell et al.

(10) Patent No.: US 12,439,901 B1
(45) Date of Patent: Oct. 14, 2025

(54) UNDERWATER FISH-LURING DEVICE

(71) Applicants: Garrett Duell, Coral Gables, FL (US); Wesley Kanter, Coral Gables, FL (US)

(72) Inventors: Garrett Duell, Coral Gables, FL (US); Wesley Kanter, Coral Gables, FL (US)

( * ) Notice: Subject to any disclaimer, the term of this patent is extended or adjusted under 35 U.S.C. 154(b) by 156 days.

(21) Appl. No.: 18/376,016

(22) Filed: Oct. 3, 2023

(51) Int. Cl.
*A01K 85/01* (2006.01)
*A01K 79/00* (2006.01)
*A01K 99/00* (2006.01)

(52) U.S. Cl.
CPC ........... *A01K 85/017* (2022.02); *A01K 79/00* (2013.01); *A01K 99/00* (2013.01)

(58) Field of Classification Search
CPC ...... A01K 79/00; A01K 85/01; A01K 85/017; A01K 99/00; A63B 23/14; A63B 23/16; G10D 13/06; G10D 13/08
USPC ...... 43/17.1, 42.31, 4, 100, 105; 482/44, 49; 84/402–404
See application file for complete search history.

(56) References Cited

U.S. PATENT DOCUMENTS

| | | | | | |
|---|---|---|---|---|---|
| 13,823 | A | * | 11/1855 | Cord | A63H 5/00 446/420 |
| 300,473 | A | * | 6/1884 | Hinden | A63B 23/16 73/379.03 |
| 464,684 | A | * | 12/1891 | Wheeler | A63H 5/00 446/422 |
| 540,136 | A | * | 5/1895 | Blaisdell | B65B 13/28 100/31 |
| 596,249 | A | * | 12/1897 | Sherman | A63H 5/00 446/422 |
| 708,242 | A | * | 9/1902 | Moseley | A63B 23/16 84/467 |
| 1,026,215 | A | * | 5/1912 | Korth | A63B 21/023 482/50 |
| 1,590,842 | A | * | 6/1926 | Mcmillin | A61C 17/24 74/89.45 |
| 1,693,140 | A | * | 11/1928 | Dietze, Jr. | A63H 5/00 43/42.31 |
| 1,761,245 | A | * | 6/1930 | Vitto | G10D 13/12 984/150 |
| 2,186,175 | A | * | 1/1940 | Prince | A63H 5/00 84/402 |
| 2,301,413 | A | * | 11/1942 | Kilcup | F16H 25/122 408/124 |
| 2,394,821 | A | * | 2/1946 | Teagarden | A63H 5/04 124/37 |
| 2,421,901 | A | * | 6/1947 | Murad | B23B 45/06 408/124 |

(Continued)

FOREIGN PATENT DOCUMENTS

JP 2017007081 A * 1/2017 ............ A01K 95/02
WO 2020163776 8/2020

*Primary Examiner* — Darren W Ark

(57) ABSTRACT

The underwater fish-luring device is configured for use in attracting fish by mimicking a sound that lobsters naturally produce. The underwater fish-luring device is an acoustic device. The underwater fish-luring device generates acoustic energy that can be detected underwater. The frequency profile of the generated acoustic energy attracts the lobster towards the underwater fish-luring device. The underwater fish-luring device comprises a plurality of levers, a torsion spring, and an acoustic generator. The torsion spring and the acoustic generator attach to the plurality of levers.

10 Claims, 5 Drawing Sheets

(56) References Cited

U.S. PATENT DOCUMENTS

| | | | | |
|---|---|---|---|---|
| 2,616,218 A * | 11/1952 | Brown | A63H 5/00 | 84/402 |
| 2,653,048 A * | 9/1953 | Novak | B25B 9/02 | 294/99.2 |
| 2,757,951 A * | 8/1956 | Benton | A47G 21/10 | 294/99.2 |
| 2,791,930 A * | 5/1957 | Soderberg | G10D 13/12 | 984/150 |
| 2,806,699 A * | 9/1957 | Spooner | A63B 21/4035 | 235/1 C |
| 2,833,078 A * | 5/1958 | Peltz | A01K 85/01 | 43/42.31 |
| 2,853,826 A * | 9/1958 | Romeo | A01K 85/01 | 43/42.31 |
| 2,881,548 A * | 4/1959 | Backe | A01K 85/01 | 43/42.31 |
| 2,905,043 A * | 9/1959 | Soderberg | G10D 13/12 | 984/150 |
| 2,977,705 A * | 4/1961 | Busnel | A01K 85/01 | 43/42.31 |
| 2,999,329 A * | 9/1961 | Pankuch | A01K 85/01 | 43/42.31 |
| 3,000,130 A * | 9/1961 | Pankuch | A01K 85/01 | 43/42.31 |
| 3,019,553 A * | 2/1962 | Gomez | G10K 3/00 | 446/422 |
| 3,049,018 A * | 8/1962 | Lusskin | A61B 17/1624 | 408/124 |
| 3,059,375 A * | 10/1962 | Tischer | G10D 13/24 | 446/422 |
| 3,170,360 A * | 2/1965 | Miettinen | G10D 13/10 | 446/422 |
| 3,290,043 A * | 12/1966 | Sorensen | A63B 69/0046 | 434/249 |
| 3,296,733 A * | 1/1967 | Mclean | A01K 85/01 | 43/42.31 |
| 3,439,572 A * | 4/1969 | Cohen | G10D 13/06 | 446/422 |
| 3,444,772 A * | 5/1969 | Martin | G10D 13/06 | 984/154 |
| 3,538,637 A * | 11/1970 | Smith | G10D 13/24 | 984/154 |
| 3,683,356 A * | 8/1972 | D'Amore | A01K 85/01 | 43/17 |
| 3,807,729 A * | 4/1974 | Sigma | A63B 21/0455 | 482/49 |
| 4,093,211 A * | 6/1978 | Hughes | A63B 23/16 | 482/122 |
| 4,262,898 A * | 4/1981 | Lee | G06M 1/083 | 235/117 A |
| 4,330,120 A * | 5/1982 | Netti | A63B 21/065 | 2/160 |
| 4,433,364 A * | 2/1984 | Noble | A63B 23/16 | 362/186 |
| 4,572,503 A * | 2/1986 | Myung Ho | A63B 5/20 | 482/49 |
| 4,623,141 A * | 11/1986 | Salvino | A63B 23/03508 | 482/49 |
| 4,753,434 A * | 6/1988 | Salvino | A63B 23/16 | 482/121 |
| 4,763,896 A * | 8/1988 | Press | A63B 23/16 | 482/122 |
| 4,798,377 A * | 1/1989 | White | A63B 23/16 | 74/551.9 |
| 4,810,228 A * | 3/1989 | Huggins | A63H 5/00 | 16/385 |
| 4,899,482 A * | 2/1990 | Gerdes | A01K 97/00 | 43/4 |
| 4,943,047 A * | 7/1990 | Noble | A63B 23/16 | 482/3 |
| 5,007,322 A * | 4/1991 | Morris | G10D 13/12 | 84/422.4 |
| 5,046,278 A * | 9/1991 | Szilagyi | A01K 79/00 | 43/17.1 |
| 5,060,934 A * | 10/1991 | Winston | A63B 23/16 | 482/126 |
| 5,207,012 A * | 5/1993 | Lael | A01K 97/00 | 7/106 |
| 5,308,299 A * | 5/1994 | Winston | A63B 23/16 | 482/126 |
| 5,497,581 A * | 3/1996 | Williams | A01K 85/01 | 43/42.46 |
| 5,529,526 A * | 6/1996 | Wesley | A01M 31/004 | 84/404 |
| 5,833,580 A * | 11/1998 | Chiu | A63B 23/16 | 482/126 |
| 6,096,957 A * | 8/2000 | Andersen | G10D 13/06 | 84/422.1 |
| 6,169,237 B1 * | 1/2001 | Sanders | G10D 13/10 | 84/404 |
| 6,199,313 B1 * | 3/2001 | Moore | A01K 85/01 | 43/42.31 |
| 6,389,735 B1 * | 5/2002 | Holt | A01K 85/01 | 340/573.2 |
| 6,512,169 B1 * | 1/2003 | Santini | G10D 13/10 | 446/419 |
| 7,263,033 B2 * | 8/2007 | Borsina | A01K 79/02 | 367/139 |
| 7,518,049 B2 * | 4/2009 | Beal | G10K 1/00 | 84/402 |
| 7,913,443 B2 * | 3/2011 | Ward | A01K 85/01 | 43/42.31 |
| D742,463 S | 11/2015 | An | | |
| 9,415,262 B2 * | 8/2016 | An | A63B 21/023 | |
| 9,700,749 B2 * | 7/2017 | Carpinelli | A63B 21/00072 | |
| 10,143,886 B2 * | 12/2018 | Carpinelli | A63B 21/025 | |
| 10,449,406 B2 * | 10/2019 | Alnajjar | A63B 21/4035 | |
| 10,688,340 B1 * | 6/2020 | Aldredge | A63B 21/0421 | |
| 11,554,291 B2 * | 1/2023 | Assad | A63B 21/028 | |
| 11,778,996 B2 * | 10/2023 | Arnoldson | H04R 1/44 | 43/2 |
| 2002/0116862 A1 * | 8/2002 | McNeil | A01K 69/00 | 43/100 |
| 2003/0019144 A1 * | 1/2003 | Thompson | A01K 79/02 | 43/4.5 |
| 2006/0225558 A1 * | 10/2006 | Bott | G10D 13/06 | 84/403 |
| 2007/0167288 A1 * | 7/2007 | Lin | A63B 23/16 | 482/49 |
| 2012/0260556 A1 * | 10/2012 | Hupp | A01K 97/00 | 43/4 |
| 2014/0038786 A1 * | 2/2014 | Garcia | A63B 21/00069 | 482/49 |
| 2017/0157463 A1 * | 6/2017 | Claesson | A63B 21/00069 | |
| 2018/0200558 A1 * | 7/2018 | Alnajjar | A63B 23/12 | |
| 2020/0260701 A1 | 8/2020 | Arnoldson | | |
| 2023/0180733 A1 * | 6/2023 | Standridge | A01K 91/065 | 43/4.5 |
| 2024/0304875 A1 * | 9/2024 | Jin | H01M 50/188 | |
| 2025/0040526 A1 * | 2/2025 | Xu | A01K 85/16 | |

\* cited by examiner

UNDERWATER FISH-LURING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of traps, more specifically, an accessory configured for use in attracting fish.

SUMMARY OF INVENTION

The underwater fish-luring device is configured for use in attracting fish. The underwater fish-luring device is an acoustic device. The underwater fish-luring device generates acoustic energy that can be detected underwater. The frequency profile of the generated acoustic energy attracts fish by mimicking sound of a lobster. The underwater fish-luring device comprises a plurality of levers, a torsion spring, and an acoustic generator. The torsion spring and the acoustic generator attach to the plurality of levers.

These together with additional objects, features and advantages of the underwater fish-luring device will be readily apparent to those of ordinary skill in the art upon reading the following detailed description of the presently preferred, but nonetheless illustrative, embodiments when taken in conjunction with the accompanying drawings.

In this respect, before explaining the current embodiments of the underwater fish-luring device in detail, it is to be understood that the underwater fish-luring device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the underwater fish-luring device.

It is therefore important that the claims be regarded as including such equivalent construction insofar as they do not depart from the spirit and scope of the underwater fish-luring device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
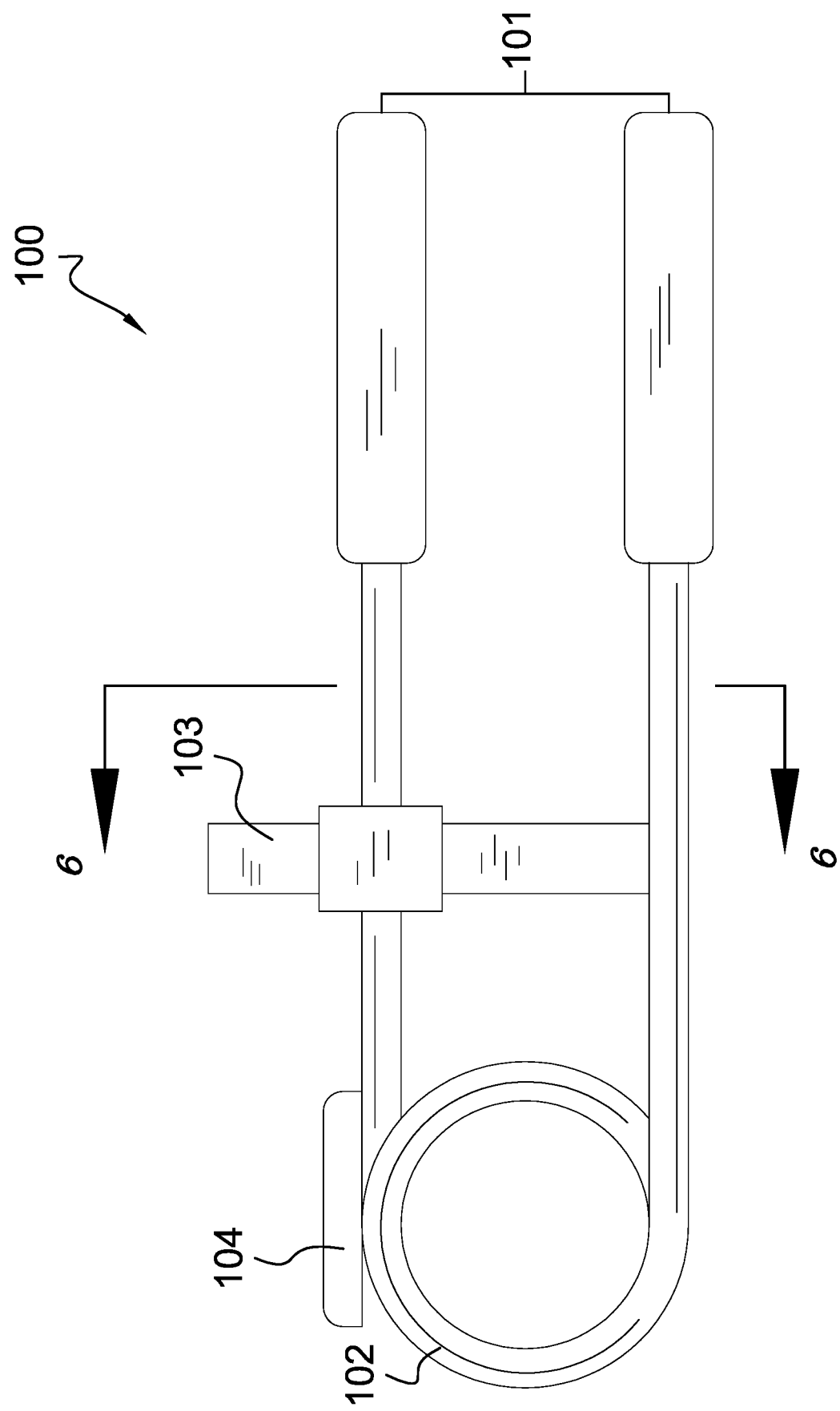
FIG. 1 is a front view of an embodiment of the disclosure.
Figure 2:
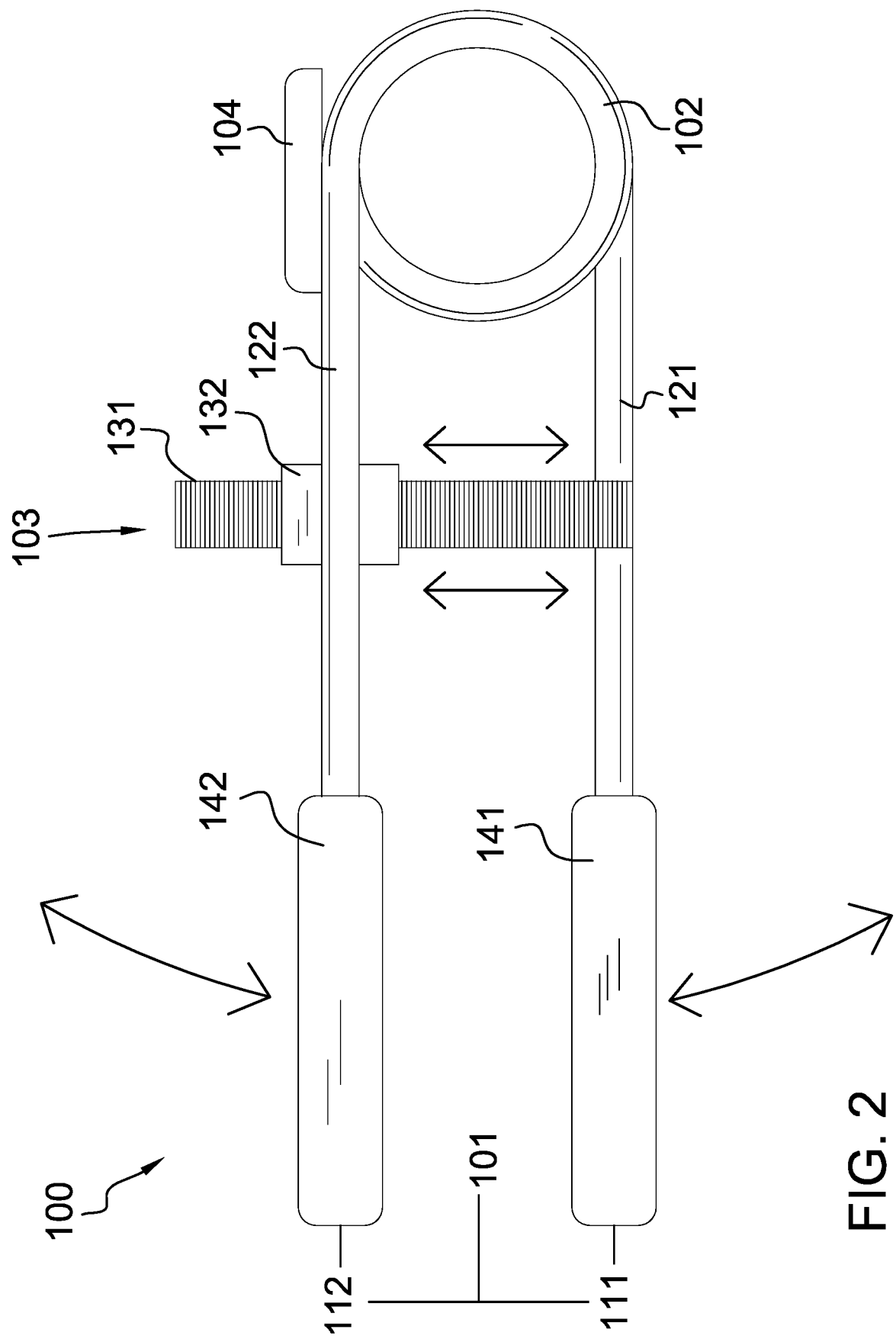
FIG. 2 is a rear view of an embodiment of the disclosure.
Figure 4:
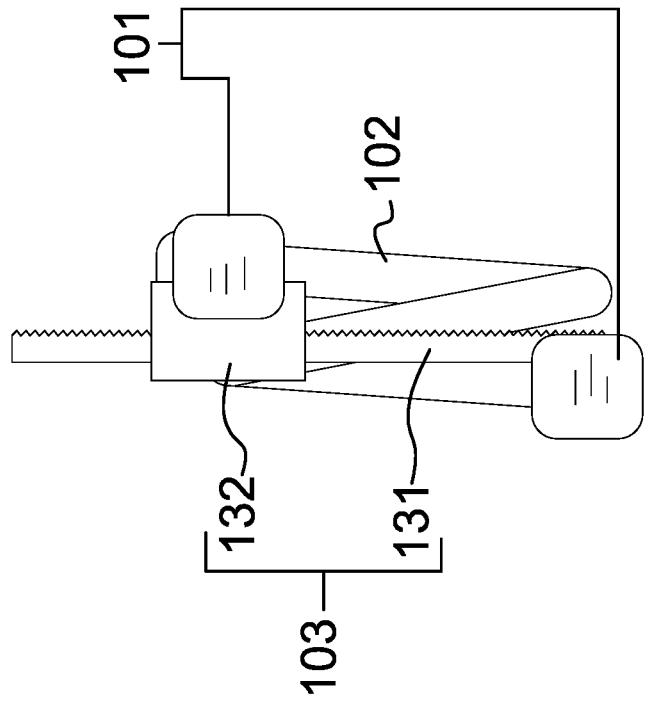
FIG. 4 is a reverse side view of an embodiment of the disclosure.
Figure 3:
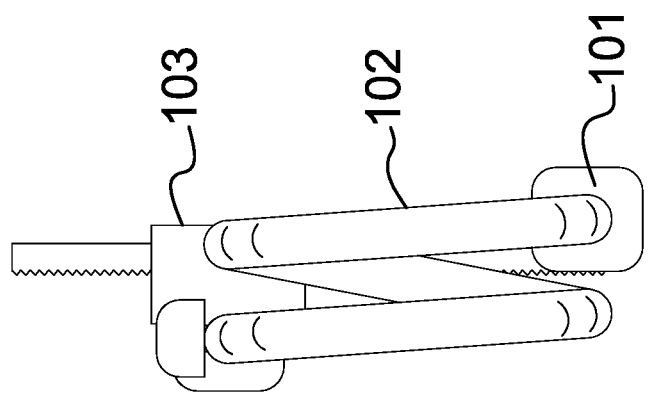
FIG. 3 is a side view of an embodiment of the disclosure.
Figure 5:
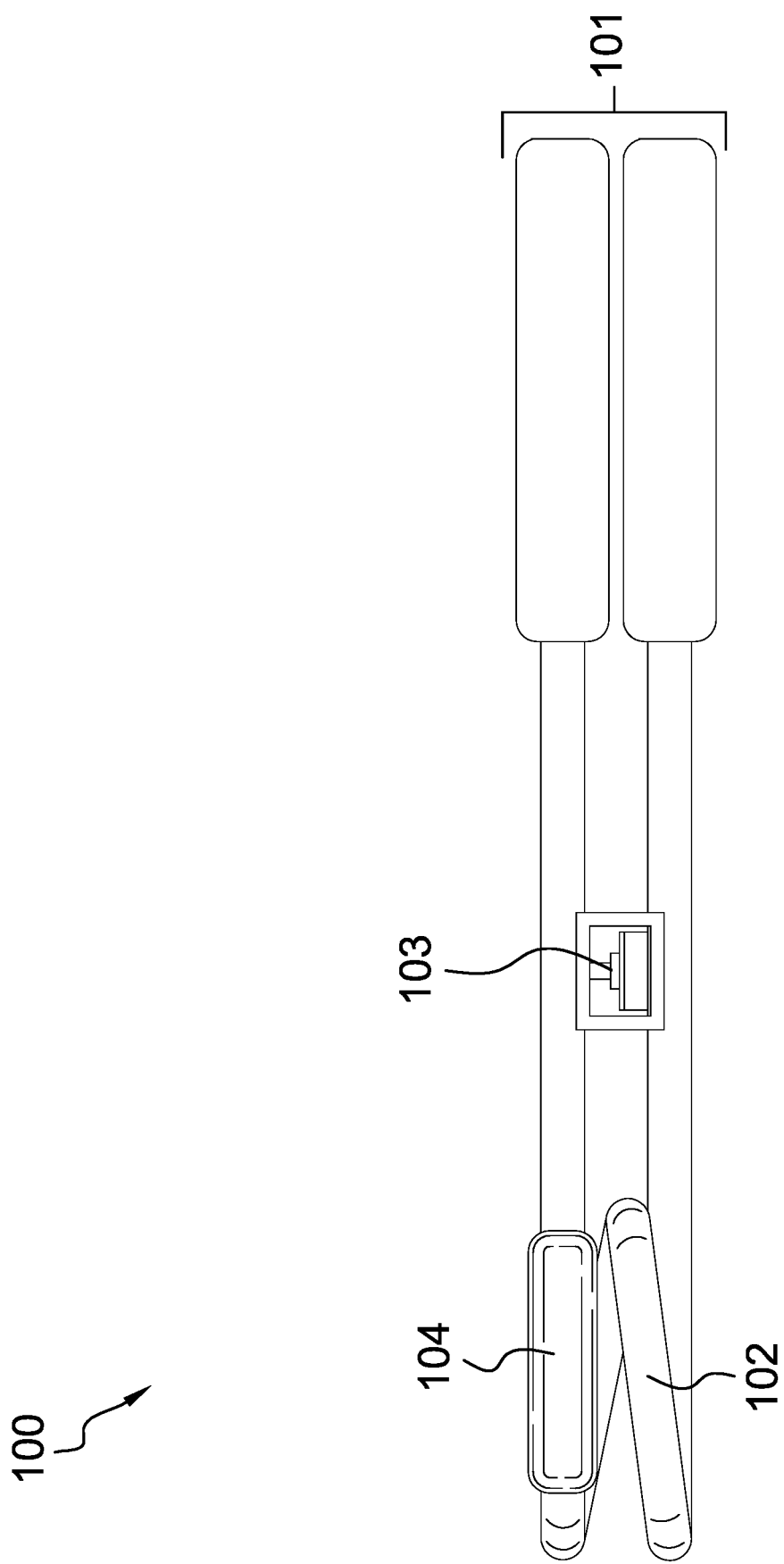
FIG. 5 is a top view of an embodiment of the disclosure.
Figure 6:
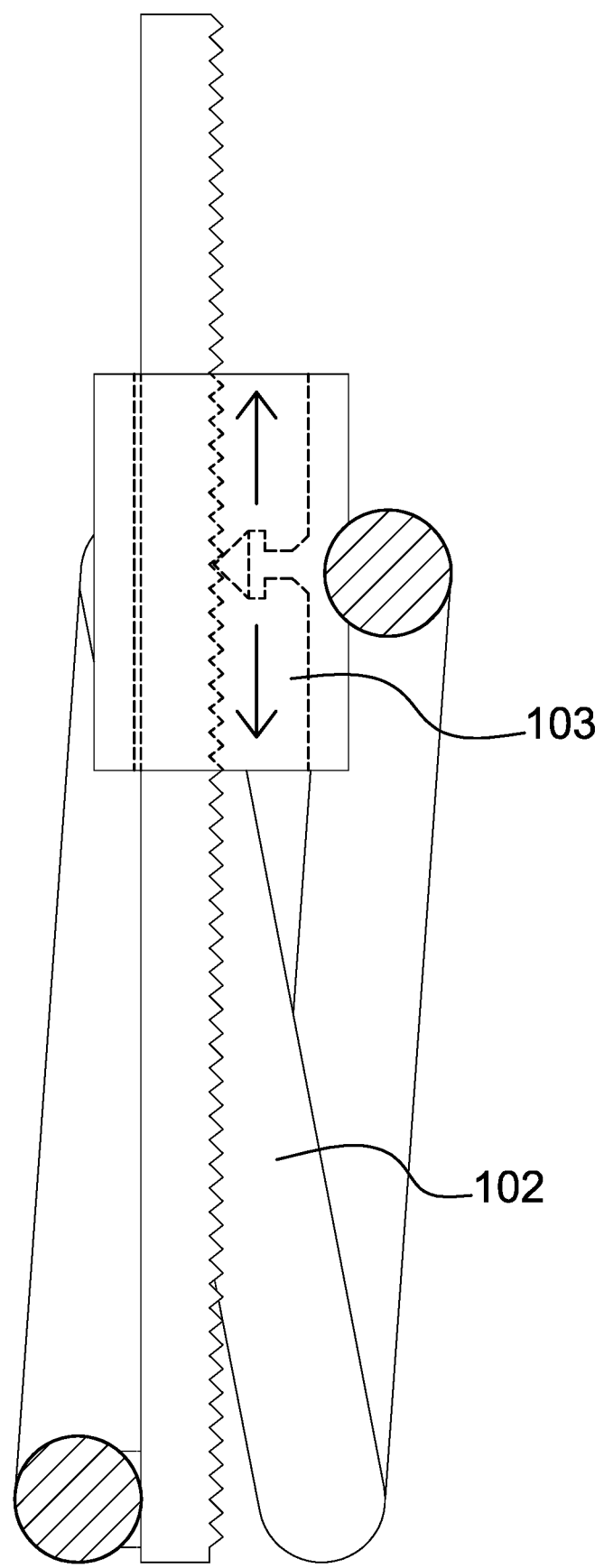
FIG. 6 is a cross-sectional view of an embodiment of the disclosure across 6-6 as shown in FIG. 1.

Detailed reference will now be made to one or more potential embodiments of the disclosure, which are illustrated in FIGS. 1 through 6.

The underwater fish-luring device 100 (hereinafter invention) is a lure. The invention 100 is configured for use in attracting fish. The invention 100 is an acoustic device. The invention 100 generates acoustic energy that can be detected underwater. The frequency profile of the generated acoustic energy attracts fish towards the invention 100. The invention 100 comprises a plurality of levers 101, a torsion spring 102, and an acoustic generator 103. The torsion spring 102 and the acoustic generator 103 attach to the plurality of levers 101.

The plurality of levers 101 forms the handle of the invention 100. The invention 100 is carried by the plurality of levers 101. The plurality of levers 101 receives an externally provided motive force. The plurality of levers 101 transfers the externally provided motive force to the acoustic generator 103. The acoustic generator 103 converts the received externally provided motive force into acoustic energy that is transmitted into a body of water containing one or more fish. The plurality of levers 101 comprises a first lever 111 and a second lever 112.

The first lever 111 is a prism shaped structure. The first lever 111 is a rigid structure. The first lever 111 attaches to the torsion spring structure 102. The first lever 111 attaches to the torsion spring structure 102 in the manner of a cantilever.

The second lever 112 is a prism shaped structure. The second lever 112 is a rigid structure. The second lever 112 attaches to the torsion spring structure 102. The second lever 112 attaches to the torsion spring structure 102 in the manner of a cantilever.

The first lever 111 and the second lever 112 are intended to fit into a hand. The first lever 111 and the second lever 112 receive the externally provided motive force when the hand is squeezed bring the center axes of the first lever 111 and the second lever 112 together. The relative motions between the first lever 111 and the second lever 112 transmit a portion of the received externally provided motive force to the torsion spring structure 102. The relative motions between the first lever 111 and the second lever 112 transmit the balance of the received externally provided motive force to the acoustic generator 103.

The first lever 111 further comprises a first grip 141. The second lever 112 further comprises a second grip 142. The first grip 141 is a cushion that attaches to the free end of the first lever 111. The first grip 141 forms a non-skid surface. The second grip 142 is a cushion that attaches to the free end of the second lever 112. The first grip 141 forms a non-skid surface.

The torsion spring structure 102 is a mechanical device. The torsion spring structure 102 is an energy storage device. The torsion spring structure 102 mechanically attaches to the 14 plurality of levers 101. The torsion spring structure 102 receives a portion of the externally provided motive force from the plurality of levers 101. The torsion spring structure 102 converts the received externally provided motive force into mechanical potential energy. As the torsion spring structure 102 returns to its relaxed shape, the torsion spring structure 102 returns the plurality of levers 101 to their original starting positions such that the invention 100 is reset for future use. The torsion spring structure 102 has a non-Euclidean prism shape. The torsion spring structure 102 has a coil spring structure. The torsion spring structure 102 comprises a first end 121 and a second end 122.

The first end 121 forms a congruent end of the non-Euclidean prism shape of the torsion spring structure 102. The first end 121 attaches to the first lever 111 such that the center axes of the first lever 111 and the torsion spring structure 102 are aligned.

The second end 122 forms a congruent end of the non-Euclidean prism shape of the torsion spring structure 102. The second end 122 attaches to the second lever 112 such that the center axes of the second lever 112 and the torsion spring structure 102 are aligned.

As the center axes of the first lever 111 and the second lever 112 are moved together the plurality of levers 101 transmits the forces to the first end 121 and the second end 122 that deform the torsion spring structure 102. The torsion spring structure 102 returns to its relaxed shape, the first end 121 and the second end 122 release the energy necessary to return the first lever 111 and the second lever 112 to their original positions.

The acoustic generator 103 is a mechanical device. The acoustic generator 103 is an acoustic device. The acoustic generator 103 is configured to operate in a fluid environment. The fluid environment is selected from the group consisting of a gas environment and a liquid environment. The acoustic generator 103 attaches to the plurality of levers 101. The acoustic generator 103 receives the balance of the externally provided motive force received from the plurality of levers 101. The acoustic generator 103 converts the received externally provided motive force into a turbulence (including cavitation) within the fluid environment. The acoustic generator 103 operates in a water environment. The acoustic generator 103 comprises an abrasive surface 131 and a scraping structure 132.

The abrasive surface 131 is a mechanical structure. The abrasive surface 131 is an elongated shaped structure. The abrasive surface 131 attached to the first lever of the plurality of levers 101. The abrasive surface 131 is formed with an abrasive face.

The scraping structure 132 is a mechanical structure. The scraping structure has either a rectangular or a hollow rectangular shape. The scraping structure 132 attached to the second lever 112 of the plurality of levers 101. The scraping structure attaches to the second lever 112 such that a congruent end of the scraping structure 132 is in physical contact with the abrasive face of the abrasive surface 131. The congruent end of the scraping structure 132 comes in physical contact with the abrasive surface 131. The scraping structure 132 attaches to the second lever 112 such that the abrasive face of the scraping structure 132 rubs against that abrasive face of the abrasive surface 131 as the received externally provided motive force moves the relative positions of the first lever 111 and the second lever 112.

The energy required to rub the scraping structure 132 against the abrasive surface 131 while the invention 100 is submerged under water converts the externally provided motive force into the energy necessary to generate an acoustic turbulence in the water. The acoustic turbulence generated by the abrasive surface 131 and the scraping structure 132 transmits acoustic waves that mimic the sound of a lobster, which are detectable by fish. The fish are naturally attracted to the location generating the acoustic turbulence as is the acoustic turbulence mimics the sound of a lobster.

Lobsters naturally making a clicking sound in an attempt to scare away predators or for communication. Lobsters rub a piece of soft tissue called the plectrum against a smooth, stiff file that is near their eye. The plectrum "sticks and slips" against the file and produces a rasping sound. The invention 100 mimics this sound in order to attract fish, which are natural predators.

The invention 100 further comprises a reflective disk 104. The reflective disk 104 is a disk shaped structure. The reflective disk 104 mounts on a lever selected from the group consisting of the first lever 111 and the second lever 112. The reflective disk 104 is polished to form a reflective surface. The reflective disk 104 reflects a visible signal that guides the fish to the invention 100.

The following definitions were used in this disclosure:

Abrasion: As used in this disclosure, abrasion refers to the rubbing of a first object against a second object in a manner that generates friction.

Acoustic: As used in this disclosure, as used in this disclosure, acoustic refers to the generation, detection, and transmission of wave based energy over a frequency range of roughly 10 Hz to 25 kHz.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cant: As used in this disclosure, a cant is an angular deviation from one or more reference lines (or planes) such as a vertical line (or plane) or a horizontal line (or plane).

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cavitation: As used in this disclosure, cavitation refers to a turbulence in a fluid flow wherein the energy of the turbulence causes a phase change within the fluid that commonly appear as bubbles.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Coil: As used in this disclosure, a coil is a structure that has the shape of a helix, volute, or a spiral.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Energy: As used in this disclosure, the energy is a term used in physics. Energy refers to the ability of a system to do work. Energy is a conserved property of a system. Energy is a quantifiable and is generally expressed in units of Joules.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Force: As used in this disclosure, a force refers to a net (or unopposed) measurable interaction that changes the direction of motion of an object, the velocity of motion of an object, the momentum of an object, or the stress within an object. The term work refers to a measure of the amount of energy that is transferred through the application of a force over a distance. The term power refers to a measure of the amount of energy that is transferred over a period of time.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute. The helix has a right handed and left handed orientation. When viewed along the center axis of the helix, if the helix structure moves away from the observer along the clockwise direction, the helix is considered a right handed helix. If the helix structure moves towards the observer along the clockwise direction, the helix is considered a left handed helix. The handedness of the helix does not depend on the end of the helix being viewed. The helix is mathematically defined by the parametric equation set: $x(t)=\cos(t)$, $y(t)=\sin(t)$, and $z=t$.

Interior: As used in this disclosure, the interior is used as a relational term that implies that an object is contained within the boundary of a structure or a space.

Lever: As used in this disclosure, a lever is a device that comprises a shaft that rotates around a fulcrum, axis of rotation, or pivot point. Levers are known for generating a mechanical advantage, known as leverage, when they are used to provide rotational force into a rotating mechanical system or device. A lever is an example of a simple machine.

Liquid: As used in this disclosure, a liquid refers to a state (phase) of matter that is fluid and that maintains, for a given pressure, a fixed volume that is independent of the volume of the container.

Lure: As used in this disclosure, a lure is an object used to attract an animal towards an object.

Mechanical Advantage: As used in this disclosure, mechanical advantage is a measure of the ratio of the force generated by a mechanical device divided by force applied to the mechanical device. The leverage generated by a lever is an example of mechanical advantage. Typically, a mechanical advantage will amplify the force input into the mechanical device but does not impact the energy transfers through the mechanical device.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Phase Change Terminology: As used in this disclosure, the following terms are used to describe a phase change. A phase change from a solid phase to a liquid phase is called melting. A phase change from a liquid phase to a solid phase is called freezing or solidification. A phase change from a solid phase to a gas phase is called sublimation. A phase change from a gas phase to a solid phase is called deposition. A phase change from a liquid phase to a gas phase is called evaporation. A phase change from a gas phase to a liquid phase is called condensation. A phase change from a gas phase to a plasma phase is called ionization. A phase change from a plasma phase to a gas phase is called recombination.

Pressure: As used in this disclosure, pressure refers to a measure of force per unit area.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reflection: As used in this disclosure, reflection refers to the change in the direction of a wave as the wave hits the boundary between two media. The direction of the reflected wave remains within the media through which the wave traveled to reach the boundary.

Reflector: As used in this disclosure, a reflector is a device that is used to change the direction of a wave. Reflectors can be used to focus the reflected wave towards a single point.

Relaxed Shape: As used in this disclosure, a structure is considered to be in its relaxed state when no shear, strain, or torsional forces are being applied to the structure.

Roughly: As used in this disclosure, roughly refers to a comparison between two objects. Roughly means that the difference between one or more parameters of the two compared objects are not significantly different.

Rub: As used in this disclosure, to rub is a verb that means to slide a first object against a second object such that friction is generated between the two objects.

Scrape: As used in this disclosure, to scrap means to slide a structure along a surface such that detritus is pushed along, and is eventually removed from, the surface.

Scratch: As used in this disclosure, to scratch is a verb that means to rub a surface with a rigid structure.

Slide: As used in this disclosure, slide is a verb that refers to an object that is transported along a surface while in continuous contact with the surface. An object being transported along a surface with wheels cannot be said to be sliding. A slide over a short distance is referred to as a slip.

Solid: As used in this disclosure, a solid refers to a state (phase) of matter that: 1) has a fixed volume; and, 2) does not flow.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Torque: As used in this disclosure, a torque refers to a force that causes an object to rotate.

Torsion: As used in this disclosure, torsion refers to the application of a torque to an object.

Torsion Spring: As used in this disclosure, a torsion spring is a mechanical device that stores mechanical energy through an opposing torque when the mechanical device is bent or twisted. The torsion spring will return to its original relaxed shape when the twisting force is removed.

Turbulence: As used in this disclosure, turbulence describes the motion or flow of a fluid wherein the velocities and pressures within the fluid flow will vary randomly or in an incalculably complex fashion.

Visible: As used in this disclosure, the term visible refers to the ability of an individual (referred to as a viewer) to see an object. The term visible implies that the direct "line of sight" between a viewer and the object does not have any opaque or semitransparent barriers between the viewer and the object that would inhibit the transmission of electromagnetic radiation between the viewer and the object. The term visibility is used to mean that an object is visible from the position of a viewer.

Wave: As used in this disclosure, a wave is a mechanism capable of transferring energy without transferring mass. Specifically, a wave refers to a transfer of momentum or energy through an object or medium such that there is no significant change in the relative positions of the particles (or molecules) that make up the object or medium.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventors claim:
1. An underwater fish-luring device comprising:
a plurality of levers, a torsion spring, and an acoustic generator;
wherein the torsion spring and the acoustic generator attach to the plurality of levers;
wherein the acoustic generator makes a sound that is configured to be similar to a noise produced by a lobster so as to lure fish towards the underwater fish-luring device;
wherein the plurality of levers comprises a first lever and a second lever, each of the first and second levers having a first end, a second free end, and a center axis;
wherein the first lever further comprises a first grip at the second free end thereof;
wherein the second lever further comprises a second grip at the second free end thereof;
wherein the first grip is a cushion that attaches to the second free end of the first lever;
wherein the second grip is a cushion that attaches to the second free end of the second lever;
wherein the torsion spring comprises a first end, a second end, and a center axis;
wherein the first lever attaches to the first end of the torsion spring at the first end of the first lever;
wherein the second lever attaches to the second end of the torsion spring at the first end of the second lever;
wherein the acoustic generator comprises an abrasive surface and a scraping structure;
wherein the abrasive surface attaches to the first lever of the plurality of levers at an intermediate location on the first lever between the first and second ends of the first lever;
wherein the abrasive surface extends from the intermediate location on the first lever so as to be perpendicular to the center axis of the first lever;
wherein the abrasive surface is formed with an abrasive face;
wherein the scraping structure attaches to the second lever of the plurality of levers at an intermediate location on the second lever between the first and second ends of the second lever;
wherein the scraping structure comprises a rectangular hollow shape which extends from the intermediate location on the second lever so as to be perpendicular to the center axis of the second lever;
wherein the abrasive surface extends from the first lever toward the second lever and also extends within the rectangular hollow shape, the abrasive surface and rectangular hollow shape being movable with respect to each other;
wherein the scraping structure attaches to the second lever such that a congruent end of the scraping structure is in physical contact with the abrasive face of the abrasive surface, the congruent end of the scraping structure located within the rectangular hollow shape;
wherein the plurality of levers receives an externally provided motive force from a user during use;
wherein the plurality of levers transfers the externally provided motive force to the acoustic generator;
wherein the acoustic generator converts the received externally provided motive force into acoustic energy;
wherein the scraping structure attaches to the second lever such that the abrasive face of the scraping structure rubs against the abrasive face of the abrasive surface as the received externally provided motive force moves the relative positions of the first lever and the second lever;
wherein the energy required to rub the scraping structure against the abrasive surface while the underwater fish-luring device is submerged under water converts the externally provided motive force into the energy necessary to generate an acoustic turbulence in the water that is configured to attract fish;
wherein the acoustic turbulence generated by the abrasive surface and the scraping structure transmits acoustic waves.

2. The underwater fish-luring device according to claim 1,
wherein the underwater fish-luring device is an acoustic device;
wherein the underwater fish-luring device generates acoustic energy that is configured to be detected by fish.

3. The underwater fish-luring device according to claim 2,
wherein the torsion spring is a mechanical device;
wherein the torsion spring is an energy storage device;
wherein the torsion spring receives a portion of the externally provided motive force from the plurality of levers;
wherein the torsion spring converts the received externally provided motive force into mechanical potential energy;
wherein as the torsion spring returns to a relaxed shape after the externally provided motive force is removed, the torsion spring returns the plurality of levers to their original starting positions which are the positions of the plurality of levers before the externally provided motive force is received.

4. The underwater fish-luring device according to claim 3,
wherein the acoustic generator is configured to operate in a fluid environment;
wherein the acoustic generator receives the balance of the externally provided motive force received from the plurality of levers.

5. The underwater fish-luring device according to claim 4,
wherein the first lever is a rigid structure; and
wherein the second lever is a rigid structure.

6. The underwater fish-luring device according to claim 5,
wherein the first lever and the second lever are adapted to fit into a hand;
wherein the first lever and the second lever are adapted to receive the externally provided motive force when the hand is squeezed bringing the center axes of the first lever and the second lever together;
wherein the relative motions between the first lever and the second lever transmit a portion of the received externally provided motive force to the torsion spring;
wherein the relative motions between the first lever and the second lever transmit the balance of the received externally provided motive force to the acoustic generator.

7. The underwater fish-luring device according to claim 6,
wherein the torsion spring has a non-Euclidean shape;
wherein the torsion spring has a coil spring structure.

8. The underwater fish-luring device according to claim 7,
wherein the first end of the torsion spring forms a congruent end of the non-Euclidean shape of the torsion spring;
wherein the first end of the torsion spring attaches to the first end of the first lever such that the center axes of the first lever and the torsion spring are aligned;
wherein the second end of the torsion spring forms a congruent end of the non-Euclidean shape of the torsion spring;
wherein the second end of the torsion spring attaches to the first end of the second lever such that the center axes of the second lever and the torsion spring are aligned;
wherein as the center axes of the first lever and the second lever are moved together, the plurality of levers transmits the forces to the first end and the second end of the torsion spring that deform the torsion spring;
wherein the torsion spring returns to the relaxed shape, the first end and the second end of the torsion spring release the energy necessary to return the first lever and the second lever to their original positions.

9. The underwater fish-luring device according to claim 8,
wherein the underwater fish-luring device further comprises a reflective disk;
wherein the reflective disk is a disk shaped structure;
wherein the reflective disk mounts on a lever selected from the group consisting of the first lever and the second lever; and
wherein the reflective disk is polished to form a reflective surface.

10. The underwater fish-luring device according to claim 9,
wherein the first grip forms a non-skid surface; and
wherein the second grip forms a non-skid surface.

* * * * *